United States Patent
Smith et al.

(10) Patent No.: US 8,194,215 B2
(45) Date of Patent: Jun. 5, 2012

(54) LIQUID CRYSTAL DEVICE AND DISPLAY APPARATUS HAVING A PAIR OF ELECTRODES WITH A VERTICAL ALIGNMENT FILM IN WHICH THE CHIRAL PITCH LENGTH TO GAP RATIO (P/G) IS 0.06 TO LESS THAN 1.0

(75) Inventors: Nathan James Smith, Oxford (GB); Benjamin John Broughton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 504 days.

(21) Appl. No.: 12/513,013

(22) PCT Filed: Oct. 25, 2007

(86) PCT No.: PCT/JP2007/071271
§ 371 (c)(1),
(2), (4) Date: Apr. 30, 2009

(87) PCT Pub. No.: WO2008/056587
PCT Pub. Date: May 15, 2008

(65) Prior Publication Data
US 2010/0066960 A1    Mar. 18, 2010

(30) Foreign Application Priority Data

Nov. 7, 2006  (GB) .................................. 0622113.9

(51) Int. Cl.
*G02F 1/141*    (2006.01)
(52) U.S. Cl. ........................................ 349/134; 349/128
(58) Field of Classification Search .................. None
See application file for complete search history.

(56) References Cited

U.S. PATENT DOCUMENTS

| | | | |
|---|---|---|---|
| RE27,617 | E | 4/1973 | Olsen et al. |
| 4,114,990 | A | 9/1978 | Mash et al. |
| 4,582,396 | A | 4/1986 | Bos et al. |
| 4,635,051 | A | 1/1987 | Bos |
| 4,764,410 | A | 8/1988 | Grzywinski |

(Continued)

FOREIGN PATENT DOCUMENTS

CN    1543579 A    11/2004

(Continued)

OTHER PUBLICATIONS

International Search Report for PCT/JP007/071271, mailed Jan. 29, 2008.

(Continued)

*Primary Examiner* — Hemang Sanghavi
(74) *Attorney, Agent, or Firm* — Nixon & Vanderhye P.C.

(57) ABSTRACT

A liquid crystal device comprises a first alignment surface which induces a high pretilt greater than 45° but less than 90°; a typical value is 85°. The pretilt has a component parallel to the surface pointing in a predetermined direction. A second alignment surface induces a low pretilt which is less than 45° but greater than 0°; a typical pretilt is 5°. The low pretilt has a component parallel to the second surface which also points in the predetermined direction. A layer of crystal material is disposed in between the first and second surfaces. A novel liquid crystal mode is thus provided and is referred to as the "splay-twist mode". Such a device may be used in a switchable public/private display.

25 Claims, 10 Drawing Sheets

U.S. PATENT DOCUMENTS

| | | | |
|---|---|---|---|
| 4,766,023 A | 8/1988 | Lu | |
| 5,147,716 A | 9/1992 | Bellus | |
| 5,398,127 A * | 3/1995 | Kubota et al. | 349/42 |
| 5,528,319 A | 6/1996 | Austin | |
| 5,686,979 A | 11/1997 | Weber et al. | |
| 5,825,436 A | 10/1998 | Knight | |
| 5,831,698 A | 11/1998 | Depp et al. | |
| 5,844,640 A | 12/1998 | Adachi | |
| 5,877,829 A | 3/1999 | Okamoto et al. | |
| 5,880,798 A * | 3/1999 | Walton et al. | 349/99 |
| 6,040,885 A | 3/2000 | Koike et al. | |
| 6,211,930 B1 | 4/2001 | Sautter et al. | |
| 6,552,850 B1 | 4/2003 | Dudasik | |
| 2001/0015782 A1 | 8/2001 | Takato et al. | |
| 2002/0030777 A1 | 3/2002 | Noguchi et al. | |
| 2002/0067451 A1* | 6/2002 | Hattori et al. | 349/129 |
| 2002/0158967 A1 | 10/2002 | Janick et al. | |
| 2002/0159013 A1 | 10/2002 | Faris et al. | |
| 2002/0167631 A1* | 11/2002 | Ishihara et al. | 349/123 |
| 2002/0180922 A1 | 12/2002 | Takato et al. | |
| 2003/0137620 A1 | 7/2003 | Wang et al. | |
| 2003/0147033 A1* | 8/2003 | Stalder et al. | 349/129 |
| 2004/0100598 A1 | 5/2004 | Adachi | |
| 2004/0100604 A1 | 5/2004 | Takato et al. | |
| 2005/0052399 A1* | 3/2005 | Hattori et al. | 345/99 |
| 2005/0190329 A1 | 9/2005 | Okumura | |
| 2005/0200785 A1* | 9/2005 | Jones | 349/134 |
| 2005/0247958 A1 | 11/2005 | Wang et al. | |
| 2005/0260426 A1 | 11/2005 | Kwok et al. | |
| 2006/0164351 A1* | 7/2006 | Hsu et al. | 345/87 |
| 2007/0024782 A1* | 2/2007 | Kwok et al. | 349/123 |

FOREIGN PATENT DOCUMENTS

| | | |
|---|---|---|
| EP | 0 933 663 | 8/1999 |
| GB | 2 276 730 | 10/1994 |
| GB | 2 314 642 | 1/1998 |
| GB | 2 405 544 | 3/2005 |
| GB | 2 410 116 | 7/2005 |
| GB | 2 413 394 | 10/2005 |
| GB | 2 404 991 | 2/2006 |
| GB | 2 418 518 | 3/2006 |
| GB | 2 421 346 | 6/2006 |
| GB | 2 426 352 | 11/2006 |
| GB | 2 427 033 | 12/2006 |
| GB | 2 428 128 | 1/2007 |
| GB | 2 439 961 | 1/2008 |
| JP | 2002-49059 | 2/2002 |
| WO | WO 2005/040899 | 5/2005 |

OTHER PUBLICATIONS

Written Opinion of the International Searching Authority for PCT/JP2007/071271, mailed Jan. 29, 2008.

UK Search Report for GB Application No. 0622113.9, dated Mar. 27, 2007.

Adachi, M., "P-228L: Late-News Poster: Controllable Viewing-Angle Displays Using a Hybrid Aligned Nematic Liquid Crystal Cell", SID 06 Digest, (2006), pp. 705-708.

Bos, P. J. et al, "The pi-Cell: A Fast Liquid-Crystal Optical Switching Device", Mol. Cryst. Liq. Cryst., vol. 113, (1984), pp. 329-339.

Gooch, C.H. et al., The Optical Properties of Twisted Nematic Liquid Crystal Structures with Twist Angles $\leqq 90°$, J. Phys. D.: Appl. Phys., vol. 8, (1975), pp. 1575-1584.

Jewell, S.A. et al., Dynamic Response of a Dual-Frequency Chiral Hybrid Aligned Nematic Liquid-Crystal Cell, Physical Reviews E., vol. 73, (Jan. 17, 2006), pp. 011706-1-011706-7.

Kubono, A. et al., "Effects of Cell Parameters on the Properties of Hybrid Twisted Nematic Displays", Journal of Applied Physics, vol. 90, No. 12, (Dec. 15, 2001), pp. 5859-5865.

Lewis, M.R. et al., "Hybrid Aligned Cholesteric: A Novel Liquid-Crystal Alignment", Appl. Physics Lett., vol. 51, No. 15, (Oct. 12, 1987), pp. 1197-1199.

Wang, B et al, "Design Optimized Bistable Twisted Nematic Liquid Crystal Display", Journal of Applied Physics, vol. 90, No. 2, (Jul. 15, 2001), pp. 552-555.

* cited by examiner

LIQUID CRYSTAL DEVICE AND DISPLAY APPARATUS HAVING A PAIR OF ELECTRODES WITH A VERTICAL ALIGNMENT FILM IN WHICH THE CHIRAL PITCH LENGTH TO GAP RATIO (P/G) IS 0.06 TO LESS THAN 1.0

This application is the U.S. national phase of International Application No. PCT/JP2007/071271 filed 25 Oct. 2007, which designated the U.S. and claims priority to Great Britain Application No. 0622113.9 filed 7 Nov. 2006, the entire contents of each of which are hereby incorporated by reference.

TECHNICAL FIELD

The present invention relates to a liquid crystal device and to a display apparatus including such a liquid crystal device.

BACKGROUND ART

Electronic display devices, such as monitors used with computers and screens built into telephones and portable information devices, are usually designed to have a viewing angle as wide as possible, so that they can be read from any viewing position. However, there are some situations where a display that is visible from only a narrow range of angles is useful. For example, one might wish to read a private document using a portable computer while on a crowded train.

There are a number of articles disclosing "hybrid aligned nematic" (HAN) and "chiral hybrid aligned nematic" (CHAN) liquid crystal (LC) cells. A hybrid aligned cell has vertical (homeotropic) alignment on one substrate) (pretilt=90° and planar alignment on the other substrate) (pretilt<10°.

Mash et al describe a CHAN LC cell for use as a pointer dial with no moving parts in U.S. Pat. No. 4,114,990 (1978). Lewis et al describe guiding of polarised light in a CHAN cell (Applied Physics Letters, Vol. 51, pp. 1197). Jewell et al describe director profile structures in CHAN cells filled with a dual frequency LC material (Phys Rev E, Vol. 73, 011706).

There are a number of articles disclosing the LC "pi-cell" or optically compensated birefringent (OCB) mode operation. A pi-cell is constructed from two substrates that have substantially identical pretilt alignment (both substrates usually induce planar alignment). The pi-cell is constructed with the rubbing directions parallel.

Bos et al describe fast switching in pi-cells (Mol. Cryst. Liq. Cryst., Vol. 113, pp. 329, patents U.S. Pat. No. 4,635,051 and GB 2 276 730.)

U.S. Pat. No. 6,552,850 (E. Dudasik; Citicorp Inc. 2003) describes a method for the display of private information on a cash dispensing machine. Light emitted by the machine's display has a fixed polarisation state and the machine and its user are surrounded by a large screen of sheet polariser which absorbs light of that polarisation state but transmits the orthogonal state. Passers by can see the user and the machine but cannot see information displayed on the screen.

A versatile method for controlling the direction of light is a 'louvre' film. The film consists of alternating transparent and opaque layers in an arrangement similar to a Venetian blind. Like a Venetian blind, it allows light to pass through it when the light is travelling in a direction parallel or nearly parallel to the layers, but absorbs light travelling at large angles to the plane of the layers. These layers may be perpendicular to the surface of the film or at some other angle. Methods for the production of such films are described in a U.S. RE27617 (F. O. Olsen; 3M 1973), U.S. Pat. No. 4,766,023 (S.-L. Lu, 3M 1988), and U.S. Pat. No. 4,764,410 (R. F. Grzywinski; 3M 1988).

Other methods exist for making films with similar properties to the louvred film. These are described, for example, in U.S. Pat. No. 5,147,716 (P. A. Bellus; 3M 1992), and U.S. Pat. No. 5,528,319 (R. R. Austin; Photran Corp. 1996).

Louvre films may be placed either in front of a display panel or between a transmissive display and its backlight to restrict the range of angles from which the display can be viewed. In other words, they make a display "private".

US 2002/0158967 (J. M. Janick; IBM, published 2002) shows how a light control film can be mounted on a display so that the light control film can be moved over the front of the display to give a private mode, or mechanically retracted into a holder behind or beside the display to give a public mode. This method has the disadvantages that it contains moving parts which may fail or be damaged and that it adds bulk to the display.

A method for switching from public to private mode with no moving parts is to mount a light control film behind the display panel and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect.

Switchable privacy devices of these types are described in U.S. Pat. No. 5,831,698 (S. W. Depp; IBM 1998), U.S. Pat. No. 6,211,930 (W. Sautter; NCR Corp. 2001) and U.S. Pat. No. 5,877,829 (M. Okamoto; Sharp K. K. 2001). They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode, unless the backlight is made brighter to compensate.

Another disadvantage relates to the power consumption of these devices. In the public mode of operation, the diffuser is switched to a diffusing state. This often means that voltage is applied to a switchable polymer-dispersed liquid crystal diffuser. More power is therefore consumed in the public mode than in the private mode. This is a disadvantage for displays which are used for most of the time in the public mode.

Another known method for making a switchable public/private display is disclosed in U.S. Pat. No. 5,825,436 (K. R. Knight; NCR Corp. 1998). The light control device is similar in structure to the louvre film described earlier. However, each opaque element in the louvre film is replaced by a liquid crystal cell which can be electronically switched from an opaque state to a transparent state. The light control device is placed in front of or behind a display panel. When the cells are opaque, the display is in its private mode; when the cells are transparent, the display is in its public mode.

The first disadvantage of this method is in the difficulty and expense of manufacturing liquid crystal cells with an appropriate shape. A second disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

Another method for making a switchable public/private display device is disclosed in JP3607272 (Toshiba 2005). This device uses an additional liquid crystal panel, which has patterned liquid crystal alignment. Different aligned segments of the panel modify the viewing characteristics of different areas of the display in different ways, with the result that the whole display panel is fully readable only from a central position.

GB2405544 describes switchable privacy devices based on louvres, which operate only for one polarisation of light. The louvres are switched on and off either by rotating dyed liquid crystal molecules in the louvre itself or by rotating the plane of polarisation of the incident light using a separate element.

In GB2413394, a switchable privacy device is constructed by adding one or more extra liquid crystal layers and polarisers to a display panel. The intrinsic viewing angle dependence of these extra elements can be changed by switching the liquid crystal electrically in the well-known way.

In GB2410116, a display is switched from public to private mode by using two different backlights which generate light with different angular ranges.

In GB2421346, a polarisation modifying layer (PML) is placed behind the exit polariser of a liquid crystal display panel. Some parts of the PML are simply transparent. Other parts change the polarisation of light passing through them so that pixels viewed through these parts are inverted in colour (bright pixels becoming dark and dark pixels becoming bright). Data sent to pixels directly behind these parts is inverted so that, when the display is viewed from a central position, the image appears normally. However, when the display is viewed from a different angle, different pixels are viewed through the retarder elements and the image is corrupted. Off-axis viewers see a confusing image which is a random dot pattern. The PML may be made from liquid crystal and may be switched off to give a public mode.

GB2418518 adds a guest host (dyed) LC layer with a patterned electrode to a standard thin film transistor (TFT) LC display. The dyed LC layer can be switched between an absorbing state (private) and non-absorbing state (public). The dye molecule absorption is dependent upon the incident angle and polarisation of light. For a given polarisation and orientation, the absorption of the dye increases with larger viewing angles resulting in low brightness at high angles (narrow mode).

GB2426352 discloses the combination of a privacy function and a three dimensional (3D) function provided by a single additional switch cell. The display has three operating states, a wide mode, a private mode and a 3D mode. Both patterned and unpatterned LC alignment embodiments are described.

The concept of using a hologram to provide a privacy function is disclosed in GB2404991 but such a display suffers from two disadvantages. First, due to unwanted diffraction of light from the display by the hologram, the colour of the image seen by viewers is incorrect. Second, for applications using a touch screen mounted on the front of the display, the user's hand can block the illumination of the hologram and so reduce the effectiveness of the privacy. GB2428128 discloses solutions to these problems.

GB2427033 discloses the use of an extra liquid crystal layer located between the existing polarisers of a liquid crystal display (LCD) panel. In this location, the extra switch cell can modify the greyscale curves for off axis light. This provides a higher level of privacy for images than the techniques disclosed in GB2413394.

GB patent application no. 0613462.1 discloses the use a switchable privacy device constructed by adding an extra cholesteric layer and circular polarisers to a display panel. The cholesteric layer can be switched between a public (wide view) mode and a private (narrow view) mode that can provide 360° azimuthal privacy.

Adachi et al (SID06, pp. 228) and Okumura (US20050190329) disclose the use of a HAN cell to provide a switchable privacy function. The HAN cells used by Adachi and Okumura are used in conjunction with an underlying image panel. The public (wide view) modes described by Adachi et al (SID06, pp. 228) and Okumura (US20050190329) are untwisted.

Kubono et al investigate switching speeds of CHAN cells that comprise a low pretilt substrate and a vertically (homeotropically) aligned substrate rubbed at 60°, 90° and 120° with respect to the low pretilt (planar) substrate (Journal of Applied Physics, Vol. 90, pp. 5859). The liquid crystal material used by Kubono et al has been chirally doped.

JP09230377 and U.S. Pat. No. 5,844,640 describe a method of changing the viewing angle properties of a single layer LCD panel. This is achieved for a Vertically Aligned Nematic (VAN) LC mode. Electric fields in the plane of the display panel are used to control how the LC material tilts in a pixel area. The number and orientation of different tilt domains within a pixel can be controlled by the in-plane fields. A pixel with several tilt domains will have a wide viewing angle; a pixel with one tilt domain will have a narrower viewing angle. The use of this method to vary the viewing angle of a display is described. However the viewing angle of a single tilt domain of the VAN mode described is not sufficiently narrow to provide good privacy.

U.S. Pat. No. 5,686,979 (3M) describes the use of reflective polariser films or "dual brightness enhancement films" (DBEF) and an additional switch LCD for use in conjunction with an existing image LCD. The optical system can be switched between a transmissive LCD mode and a reflective LCD mode. In the reflective LCD mode, the ambient light is used instead of a backlight to display an image on the existing image panel.

Switchable mirror display patents EP 0 933 663 B1 (Citizen) and JP34197661 (Hitachi) describe the use of reflective polariser films (DBEF) and an additional LCD for use in conjunction with an existing image LCD. This optical system can be electrically switched between two modes of operation: 1) a public (wide view) mode whereby the additional LCD and DBEF film do not alter the image from the existing image LCD; 2) a mirror mode whereby ambient light is reflected from the DBEF to produce a mirror mode.

DISCLOSURE OF INVENTION

According to a first aspect of the invention, there is provided a liquid crystal device comprising: a first alignment surface arranged to induce a first pretilt which is less than 90° and more than 45° and has a component parallel to the first surface pointing in a predetermined direction; a second alignment surface arranged to induce a second pretilt which is greater than 0° and less than 45° and has a component parallel to the second surface pointing in the predetermined direction; and a layer of a liquid crystal material disposed between the first and second surfaces.

The first pretilt may be greater than 65°. The first pretilt may be greater than 75°. The first pretilt may be greater than or substantially equal to 85°. The first pretilt may be substantially equal to 85°.

The second pretilt may be less than 20°. The second pretilt may be less than 15°. The second pretilt may be less than or substantially equal to 5°. The second pretilt may be substantially equal to 5°. The second pretilt may be substantially equal to 5°. The first and second surfaces may be rubbed in the predetermined direction.

The material may be a nematic liquid crystal material. The material may contain a chiral dopant. The ratio of the thickness of the layer to the chiral pitch may be less than 0.75. The ratio may be substantially equal to 0.3.

The material may be of negative dielectric anisotropy.

The material may be of positive dielectric anisotropy.

The material may be a dual frequency liquid crystal material.

The device may comprise an arrangement for applying a field across the layer. The field may be an electric field. The field applying arrangement may comprise first and second electrode arrangements disposed on opposite sides of the layer. At least one of the first and second electrode arrangements may comprise a patterned electrode.

The field applying arrangement may be arranged selectively to apply at least one first field for establishing a splay-bend director configuration.

The field applying arrangement may be arranged selectively to apply at least one second field for establishing a splay-twist director configuration.

The device may comprise first and second linear polarisers disposed on opposite sides of the layer. At least one of the first and second polarisers may be a reflective polariser. Each of the first and second polarisers may have a transmission axis which is parallel or perpendicular to the predetermined direction.

According to a second aspect of the invention, there is provided a display apparatus comprising a device according to the first aspect of the invention cooperating with an image display.

The image display may be a liquid crystal display.

The device may be controllable to select any one a plurality of modes of display operation. The modes may include a private viewing mode. The modes may include a public viewing mode. The modes may include a mirror mode. The modes may include an autostereoscopic mode.

It is believed that a new and previously unknown liquid crystal mode of operation has been found. An application of a device incorporating this mode, which is referred to hereinafter as the "splay-twist mode", is in switchable privacy devices. For example, such a device may be used with a display, such as an LCD, to allow switching between a public or wide view mode and a private or narrow view mode of operation. Some embodiments may be used to provide a selectable mirror mode of operation. Some embodiments may be used to provide an autostereoscopic three dimensional (3D) mode of operation.

BRIEF DESCRIPTION OF DRAWINGS

Like reference numerals refer to like parts throughout the drawings.

BEST MODE FOR CARRYING OUT THE INVENTION

Figure 1:
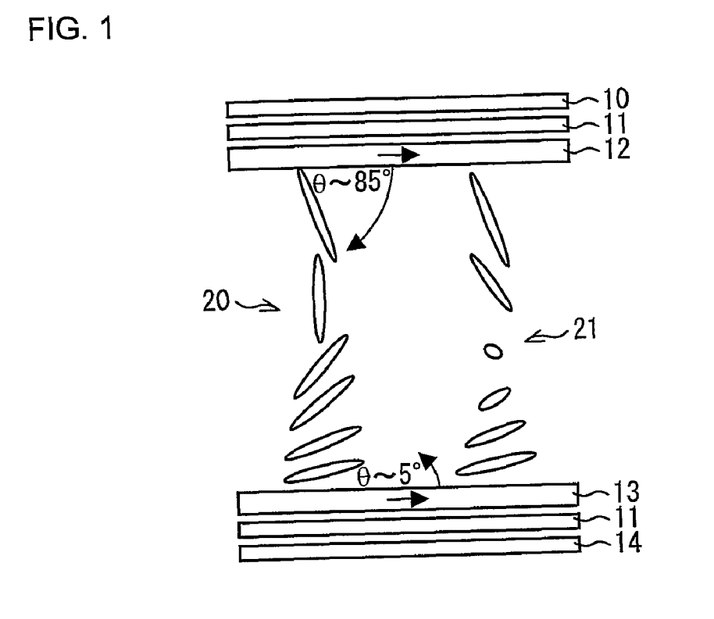
FIG. 1 is a diagrammatic cross-sectional view of a liquid crystal device constituting an embodiment of the invention.

The liquid crystal device shown in FIG. 1 comprises transparent substrates 10 and 14, for example made of glass, provided with transparent electrode arrangements 11, for example made of indium tin oxide (ITO). The upper substrate 10 is provided with an alignment layer 12 for promoting a high pre-tilt alignment but not a vertical (homeotropic) alignment. Thus, the pretilt θ is less than 90° and is greater than 45° but typically in the range above 75° and below 90°. A typical pre-tilt is approximately 85°. The alignment layer 12 is made of a material which is typically used to promote vertical alignment in its unrubbed state but is rubbed during alignment so as to provide a non-vertical pre-tilt. An example of such a material is known as JALS 2017 available from JSR.

The lower substrate is provided with an alignment layer 13 for promoting a lower pretilt which is greater than 0° but less than 40°. The pretilt is typically in the range above 0° and below 15° and an example of a suitable pretilt is 5°. The alignment layer 13 may, for example, comprise a material known as SE610 available from Nissan Chemicals and is rubbed in the direction indicated by the arrow.

The device is formed by assembling the substrates so as to provide a cell which is filled with a suitable liquid crystal material. The substrates are aligned such that the rubbing directions of the alignments layers 12 and 13 are parallel and point in the same direction. In other words, the pretilts at the alignment surfaces have components parallel to the alignment surfaces which point in the same directions. Once the device has been assembled, the resulting cell between the alignment layers 12 and 13 is filled with a nematic liquid crystal material. For example, the liquid crystal material thus forms a layer between the alignment layers 12 and 13 with a director configuration determined by the alignment layers and by any applied electric field between the electrode arrangements 11.

Upon filling such a splay-twist cell, a mixture of two deformation states is observed. It is believed that these are a splay-bend deformation and a splay deformation. The splay deformation and the splay-bend deformation are topologically distinct as disclosed by Wang and Bos, J. Appl. Phys., Vol. 90, pp 552 (2001). The splay-bend deformation shown at 20 has a director that passes through vertical near the "high pretilt" substrate 10 whereas the splay deformation, to the best of our knowledge, has a director profile that passes through a horizontal position near the "low pretilt" substrate 14. The splay mode has no practical use in the applications described here. By application of a suitable out-of-plane electric field, the splay-bend deformation state 20 is nucleated over the entire display area and remains stable with no field applied i.e. the splay deformation is completely removed. (All electric fields discussed herein are out-of-plane electric fields, i.e. in a direction substantially perpendicular to the substrate).

The splay-twist cell may be filled with an LC that has negative dielectric anisotropy or positive dielectric anisotropy. A negative dielectric anisotropy material enables good control over a public (wide view) mode but offers poor control over the private (narrow view mode). A positive dielectric anisotropy material enables good control over a private (narrow view) mode but offers poor control over the public (wide view) mode. Optimal performance may be found when the splay-twist cell is filled with a dual frequency LC material, for example MDA-00-3969 (MLC-2048) available from Merck. A dual frequency LC has a positive dielectric anisotropy for a given driving frequency range (usually low frequencies<1 kHz) and a negative dielectric anisotropy for a different given driving frequency range (usually high frequencies>10 kHz). Therefore a splay-twist cell filled with a dual frequency LC enables good control over both the private (narrow view) mode and the public (wide view) mode.

The application of an electric field can be used to switch between the splay-bend deformation 20 and a splay-twist deformation 21. When the splay-twist cell is arranged between parallel linear polarisers with the substrate rubbing direction either parallel or perpendicular to the transmission axes of the polarisers, three distinctly useful optical regimes can be realised.

Optical Regime 1: by application of a suitable large out-of-plane electric field, the bulk of the LC director aligns perpendicular to the electric field and parallel to the substrate plane. A combination of the rubbed alignment conditions and the appropriate electric field forces the director to adopt a splay-twist deformation 21. The director forms a twisted structure from the low pretilt substrate 14 to the high pretilt substrate 10. If the LC layer is thick enough (>~10 µm) to satisfy the Mauguin guiding condition, then the polarisation state of the light entering the splay-twist mode has the same polarisation state as the light exiting from the splay-twist mode. This optical effect can be used as a public (wide view) mode since no modification of an underlying image displayed on an image LCD would occur. If the LC layer is too thin to satisfy the Mauguin guiding condition, then the Gooch-Tarry guiding criteria (Gooch and Tarry, J. Phys. D., Vol. 8, pp 1575 to 1584 (1975)), can be employed to ensure that light entering the splay-twist mode 7 has the same polarisation state as the light exiting from the splay-twist mode.

Optical Regime 2: by application of a suitable out-of-plane electric field that is smaller than the electric field applied in Optical Regime 1, a smaller proportion of the director structure aligns perpendicular to the electric field (parallel to the substrate plane). A combination of the rubbed alignment conditions and the electric field still force the director to adopt a splay-twist deformation 21. Although the director is still twisted from the low pretilt substrate 14 to the high pretilt substrate 10, because the applied voltage is smaller than in Optical Regime 1, a large proportion of the LC layer has a high tilt. The optical effect is that light propagating largely on-axis is converted to the orthogonal polarisation state. Consequently the cell appears black between parallel polarisers. By appropriate patterning of the electrodes in the splay-twist cell, alternate rows (or alternate columns) of Optical Regime 1 and Optical Regime 2 can be realised. Since Optical Regime 2 appears black on-axis while Optical Regime 1 appears transparent, a parallax barrier that can enable the viewing of autostereoscopic 3D images from an underlying image LCD can be realised.

If the polariser below the splay-twist cell is a reflective polariser sheet, such as a DBEF (Dual Brightness Enhancement Film), then a mirror mode can be realised by switching the entire splay-twist mode into optical regime 2. The transmission axis of the DBEF is orientated parallel to the transmission axis of the additional polariser (i.e. DBEF polarisation sensitive reflection axis is perpendicular to transmission axis of the additional polariser). Therefore light propagation on-axis from the backlight 5 is always transmitted through the DBEF film regardless of the splay-twist mode. With the splay-twist mode operating in Optical Regime 2, the polarisation state of ambient light incident on the splay-twist cell will be converted to the orthogonal polarisation state upon emerging from the splay-twist cell and consequently will be reflected back from the DBEF film. Upon reflection from the DBEF, the light propagates back through the splay-twist cell, is converted to the orthogonal polarisation state and is transmitted though the additional polariser. Therefore the light reflected from the DBEF successfully exits the optical system substantially unattenutated providing the display with a mirror function.

In a suitably chirally doped LC cell, Optical Regime 2 can be configured to occur at no applied field. This will occur with a d/p (cell thickness divided by chiral pitch) ratio ~0.3.

Optical Regime 3: In an undoped cell, application of a suitable out-of-plane electric field causes the director to adopt the splay-bend deformation 20 (LC director is not twisted) and the director passes through a vertical)($\theta=90°$) position near the high pretilt surface. The exact details of the director deformation in a chirally doped splay-twist cell are more complicated but the optical response is largely the same as the undoped cell assuming that the doping level, d/p, is less than 0.75. In this mode, no polarisation conversation occurs for light propagating substantially on-axis and therefore this mode appears substantially transparent on-axis. However, light propagating off-axis)($\theta>\pm30°$) and in a direction approximately perpendicular to the rubbing direction is converted to the orthogonal polarisation state and is blocked by the additional polariser. This is the private (narrow view) mode that provides image privacy. The polar angle at which the privacy strength becomes substantial can be controlled to some extent by the magnitude of the appropriate applied field (1-10 Volts) and the thickness of the cell. The thicker the cell, the larger the range of off-axis angles over which privacy occurs.

Figure 2:
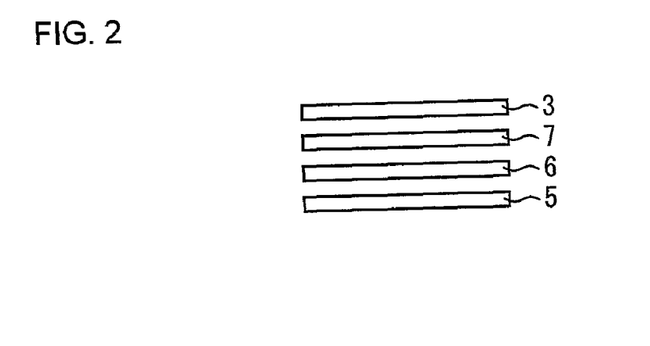
FIG. 2 is a diagrammatic side view of a display apparatus including a device of the type shown in FIG. 1.

FIG. 2 illustrates the use of the liquid crystal device shown in FIG. 1 with a display 6 for providing conventional image display. Image display 6 may be of any type which supplies linearly polarised light of the appropriate polarisation to the device 7. For example, the display 6 may be an LCD of any suitable type, for example including twisted nematic (TN), advanced superview (ASV), vertically aligned nematic (VAN) and super twisted nematic (STN). The device 7 allows the display apparatus to be switched between public and private viewing modes as described hereinbefore. In the examples shown in FIG. 2, the display apparatus further comprises an additional polariser 3 and a backlight 5 for a transmissive display apparatus 6, for example of LCD type. Further, by patterning one or more of the electrode arrangements 11 of the device 7, as described hereinafter, the splay-twist cell 7 may be controlled to operate as a parallax barrier so as to provide an autostereoscopic 3D display.

In the arrangements illustrated in FIG. 2, the order of the components may be changed, for example such that the locations of the polariser 3 and the display 6 are exchanged.

Figure 3:
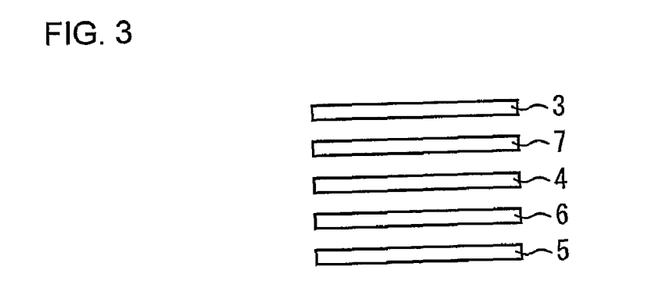
FIG. 3 is a diagrammatic side view of another display apparatus including a device of the type shown in FIG. 1.

In the display apparatus in FIG. 3, a DBEF 4 is disposed between the device 7 and the display 6. Such an arrangement is capable of operating in the mirror mode described hereinbefore.

Figure 4:
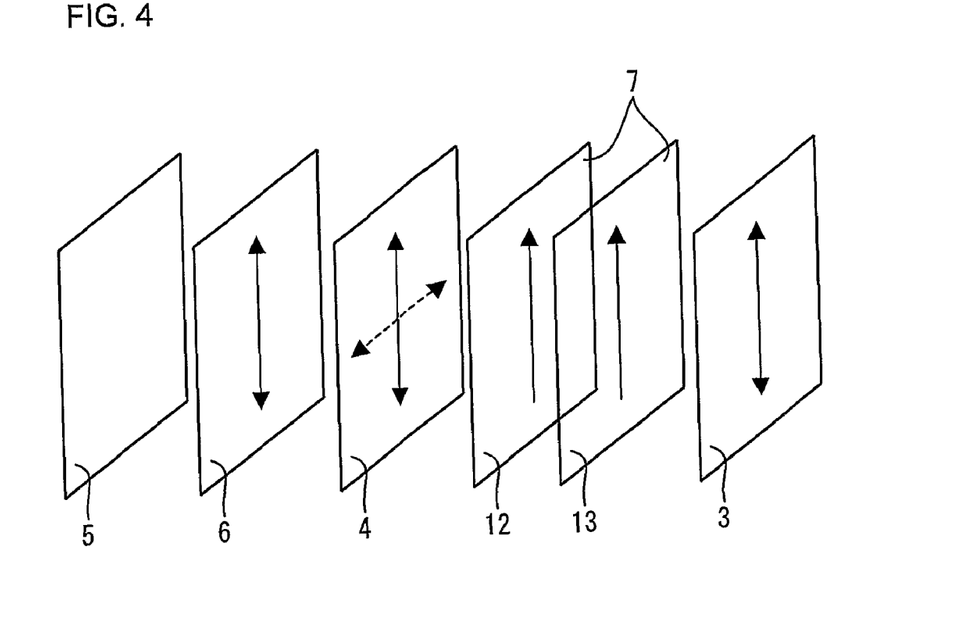
FIG. 4 is a diagram illustrating the orientation of polariser transmission axes and alignment directions in the apparatus shown in FIG. 3.

As shown in FIG. 4, the exit polariser of the LCD 6 and the polariser 3 have parallel transmission axes which, in this embodiment, are parallel to the rubbing or alignment directions of the alignment layers 12 and 13. The DBEF 4 has a transmission axis which is parallel to the transmission axes of the polarisers and reflects light with the orthogonal linear polarisation.

The mirror function relies upon the implementation of a reflective polariser, such as a DBEF available from 3M. An ordinary polariser absorbs light linearly polarised in one orientation while transmitting the orthogonal linear polarisation state. A DBEF reflects linearly polarised light of one orientation while transmitting the orthogonal linear polarisation state. The use of a DBEF allows a switchable mirror function to be obtained. An alternative reflective polariser can also be used to realise a mirror function based upon a cholesteric reflective polariser (Chelix). A cholesteric reflective polariser reflects circularly polarised light of one handedness while transmitting the orthogonal circular polarisation. To implement a cholesteric reflective polariser in a display system in place of a DBEF such as that shown in FIG. 4, ¼ waveplates (¼ wave retarders) must be adhered to the front and back of the cholesteric reflective polariser film. The analyser of the display 6 and one ¼ waveplate combine to produce the handedness of circularly polarised light that is transmitted by the cholesteric reflective polariser. The other ¼ waveplate ensures that ambient light that exits the cell 7 in optical regime 2 is converted to the circular handedness that is reflected from the cholesteric reflective polariser (i.e. a mirror function is realised). The effect of the first ¼ waveplate is to transform the incident linearly polarised light to a circularly polarised state so that the circular reflective polariser can operate correctly. The effect of the second ¼ waveplate is to transform the ambient light transmitted through the cell 7 to a circular polarisation state that is reflected by the cholesteric reflective polariser. If the light emitted from the image LCD 6 is already circularly polarised (such as the Sharp ASV mode), then only a single ¼ waveplate is required to be added to the cholesteric reflective polariser. This single ¼ waveplate is positioned between the circular reflective polariser and the cell 7.

It is not possible simultaneously to optimise all three optical regimes. However, good all round optical performance using reasonably low drive voltages (<20 V) can be obtained with the following parameters:

A cell that has a thickness of ~40 µm;
High pretilt alignment layer inducing a pretilt of ~85°;
Low pretilt alignment layer inducing a pretilt of ~5°;
Dual frequency LC;
Chiral dopant with a cell thickness to pitch (d/p) ratio of ~0.1

Figure 5:
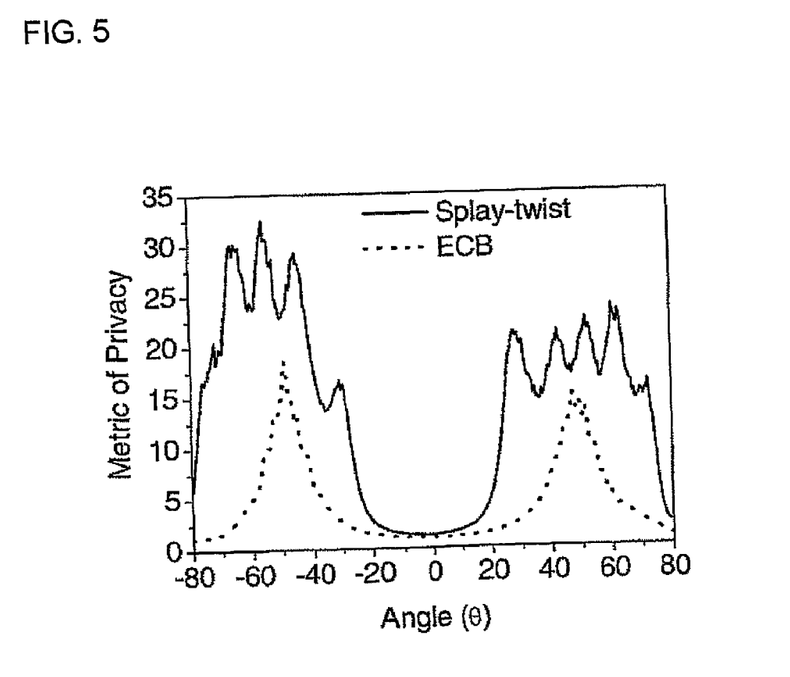
FIG. 5 is a graph illustrating the privacy performance in arbitrary units against viewing angle in degrees for a display of the type shown in FIG. 2 and for a known type of display.

FIG. 5 provides a comparison of the measured privacy provided by an example of the apparatus shown in FIG. 3 or 4 with the ECB mode used in a product known as NTTDocom SH902i. The plot shows privacy strength as a function of polar angle in the plane of maximum privacy (i.e. a plane perpendicular to the rubbing direction and perpendicular to the substrate). The splay-twist mode has a higher metric of privacy over a larger range of off-axis angles. The metric of privacy is defined by the contrast ratio of public (wide view) luminance divided private (narrow view) luminance. The ECB cell used in the NTTDocom SH902i product is comprised of two low pretilt substrates)(θ<15° that are aligned with the respective rubbing directions in an anti-parallel manner i.e. the alignment conditions are substantially different from the splay-twist mode. When switched with out-of-plane electric fields, the director in an ECB cell never forms a twisted structure. Therefore the ECB cannot be used to generate a mirror mode or autostereoscopic 3D mode without the addition of costly in-plane electrodes.

Figure 6:
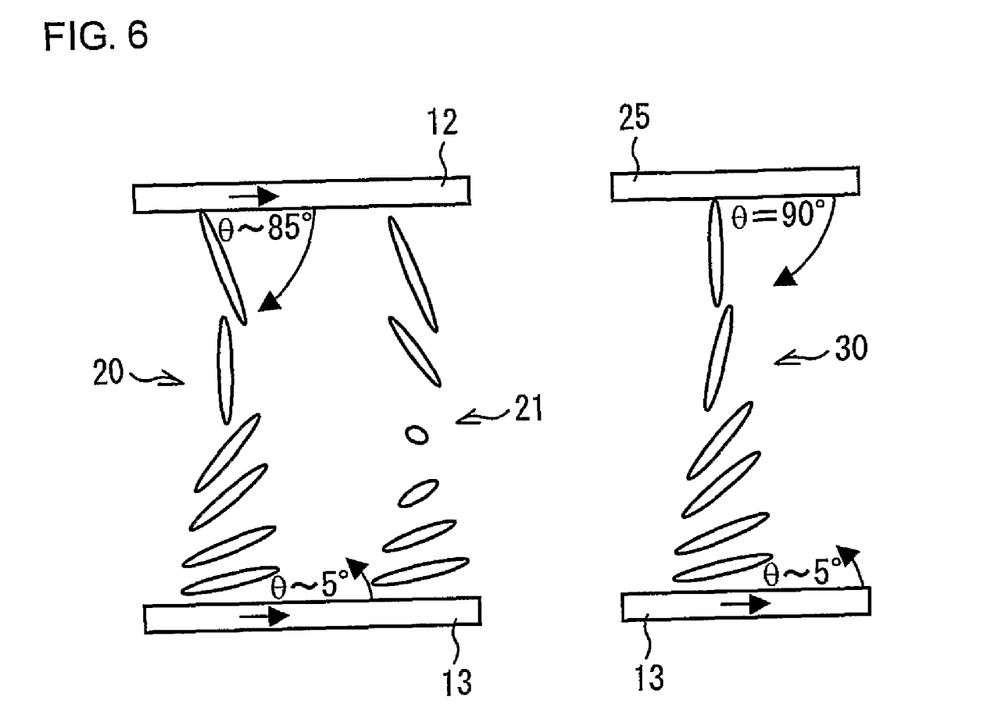
FIG. 6 is a diagrammatic cross-sectional view of the device of FIG. 1 and a known type of device.

FIG. 6 illustrates a comparison between the director structures of a known HAN and the splay-twist mode. The high pretilt substrate 25 of the HAN either has no rubbing) (θ=90°) or rubbing that is anti-parallel with respect to the low pretilt substrate. No rubbing of the HAN's high pretilt substrate is shown in FIG. 6. If the HAN has anti-parallel rubbing conditions, then no twisted director structure is formed regardless of the applied out-of-plane field. The rubbing directions of the splay-twist mode are parallel. As a direct consequence of the rubbing conditions, application of a suitable large out-of-plane electric field enables the splay-twist mode to form a twisted director structure at a threshold voltage. However, the HAN mode cannot form a twisted structure regardless of the electric field that is applied.

FIG. 7 illustrates a comparison between the director structures (director tilt and twist profiles) of the known HAN mode, the known CHAN mode and the splay-twist mode as a function of normalised distance through the cell. The ratio of cell thickness (d) to chiral pitch (p) in the CHAN mode was 0.1 (i.e. d/p=0.1). All modelled cell thicknesses were 40 microns. The director structures were produced by liquid crystal numerical modelling software (DiMOS, Autronic Melchers). The magnitude of the pretilt on the high pretilt substrate is the same for all three modes. The magnitude of the pretilt on the low pretilt substrate is the same for all three modes. However, the rubbing directions of the HAN and CHAN modes are anti-parallel whereas the rubbing directions of the splay-twist mode are parallel. The modelling is performed with the same director orientation on the low pretilt surface for the HAN, CHAN and splay-twist modes. All modelling is performed with a negative dielectric anisotropy liquid crystal ($\Delta\epsilon=-3$).

Figure 7A:
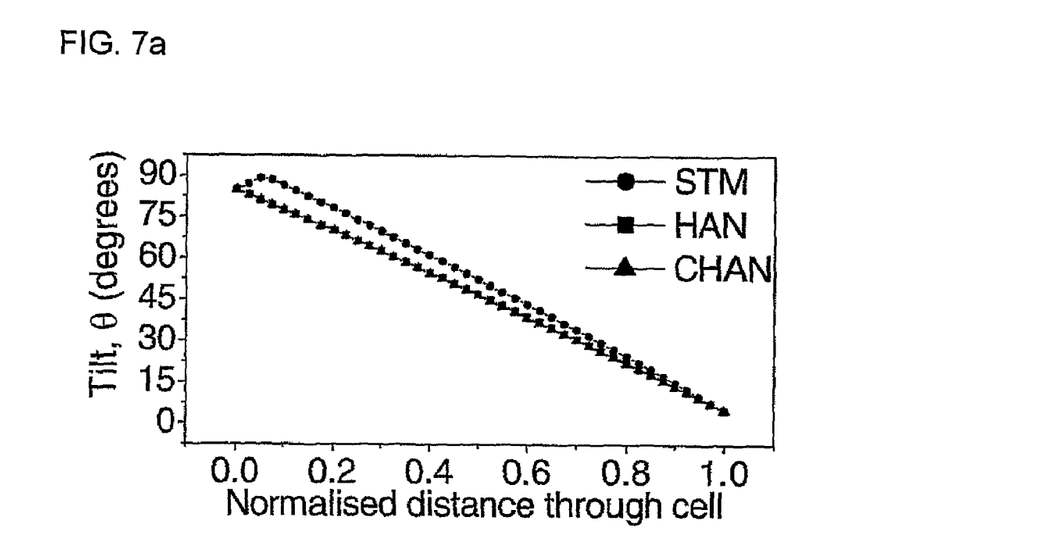
FIG. 7a to FIG. 7d are graphs of tilt and twist in degrees against normalised distance through a liquid crystal layer of a device for comparing the operation of a device of the type shown in FIG. 1 with two known types of devices.
Figure 7B:
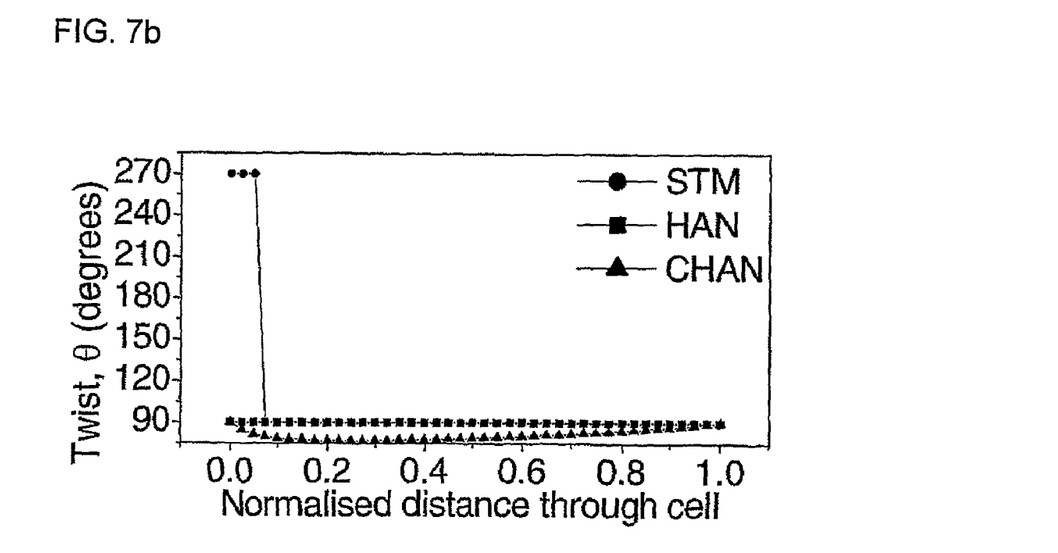

As indicated in FIG. 7a, at zero volts, the tilt (θ) profile of the splay-twist mode increases from 85° to 90° (i.e. increases to vertical) and then falls to 5° whereas the tilt profile of the HAN and CHAN modes decreases linearly from 85° to 5°. As indicated in FIG. 7b, at zero volts the twist (φ) profile of the splay-twist mode remains constant at 270° until the tilt reaches 90° (i.e. vertical) at a distance of about 0.09 normalised units through the cell from the high pretilt substrate. When the tilt reaches 90°, the twist angle cannot be defined. After about 0.09 normalised units through the splay-twist cell, the tilt decreases from 90° and the twist adopts a new value of 90° (same as the HAN mode). Although the twist in the splay-twist cell has adopted a different value (270° to 90°), all director distortions are constrained to a single plane. Therefore the splay-twist mode at 0 volts is untwisted (i.e. the splay-twist mode has adopted a splay-bend deformation as indicated in FIG. 1.

At zero volts, the CHAN cell demonstrates a smooth, continuous variation of twist through the cell (i.e. the director of the CHAN cell is not constrained to a single plane; the director structure is twisted). At zero volts, the HAN cell demonstrates a constant value of twist through the cell (i.e. the director of the HAN cell is constrained to a single plane; the director structure is untwisted).

Figure 7C:
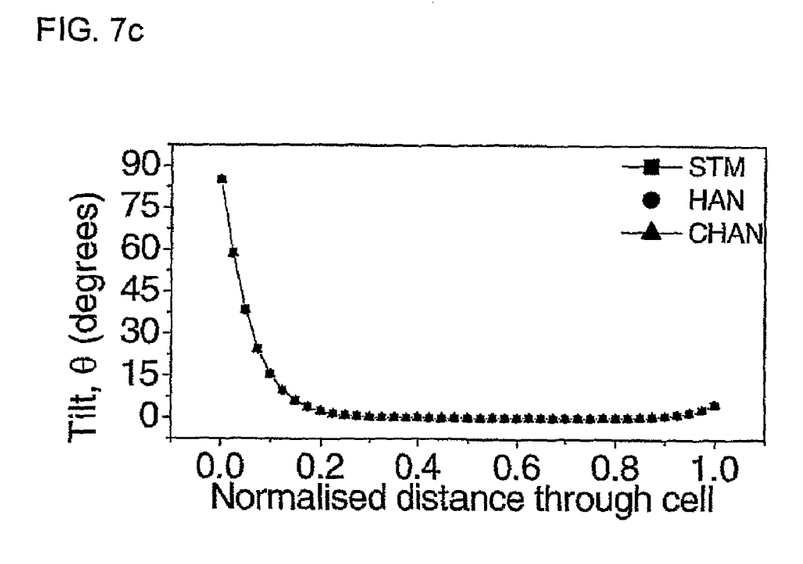
Figure 7D:
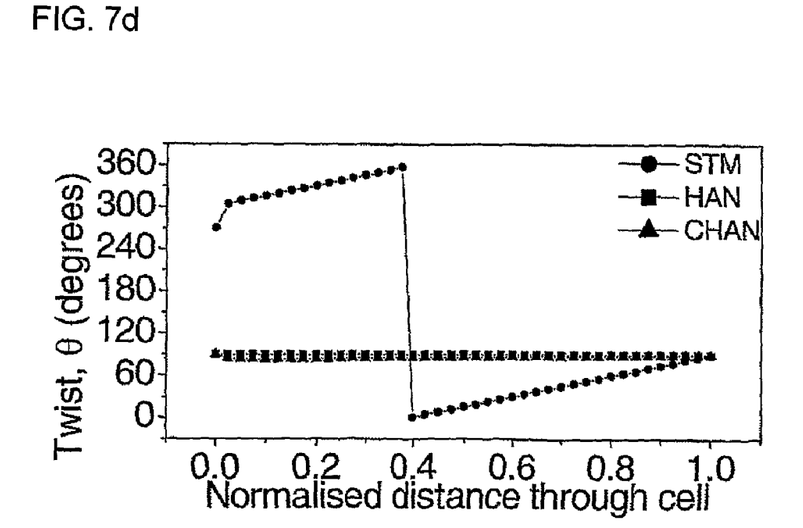

As indicated in FIG. 7c, at 16 volts the tilt profiles of the splay-twist mode, the CHAN mode and the HAN mode are virtually identical with the majority of the LC director laying parallel to the substrate plane and perpendicular to the applied electric field (i.e. θ=0°). However, as indicated in FIG. 7d, at 16 volts the twist profiles of the HAN, CHAN and splay-twist modes are completely different. The HAN mode has a uniform, single value of twist at 16 volts, i.e. the director profile is not twisted. The CHAN mode has an almost uniform, single value of twist at 16 volts, i.e. the director profile is substantially not twisted. At 16 volts (above threshold of splay-bend to splay-twist transition), the splay-twist mode adopts a twisted structure through the cell. In the splay-twist mode, the director twists through a total angle of 180° from the high pretilt substrate to the low pretilt substrate.

Twist angles of x° and x°+360° are degenerate director configurations—hence the sharp jump in twist angle at 0.4 normalised units through the cell in FIG. 7d is not a discontinuous change in director orientation but merely a redefinition of the twist angle.

Modelling reveals that, at a threshold voltage, the splay-twist mode will transform from a splay-bend deformation (untwisted) to a splay-twist deformation (twisted). By chirally doping the splay-twist mode, the threshold voltage for the splay-bend to splay-twist deformation can be reduced. Chiral doping also breaks the energetic degeneracy between left and right handed twisted states in the splay-twist deformation and can therefore be used to prevent the formation of reverse twist domains. The origin of twist in the undoped splay-twist mode is due to the alignment conditions. The alignment conditions of the splay-twist mode are subtly different from the HAN and CHAN modes. Specifically, the origin of a twisted structure upon application of a suitable electric field in the splay-twist mode is due to the parallel rubbing conditions of the low pretilt and high pretilt alignment layers. The absence of a twisted structure in the HAN mode is due to the fact that the high pretilt alignment layer is either not rubbed (pretilt θ=90°) or rubbed such that the direction of rubbing is anti-parallel with respect to the low pretilt alignment layer.

Figure 8:
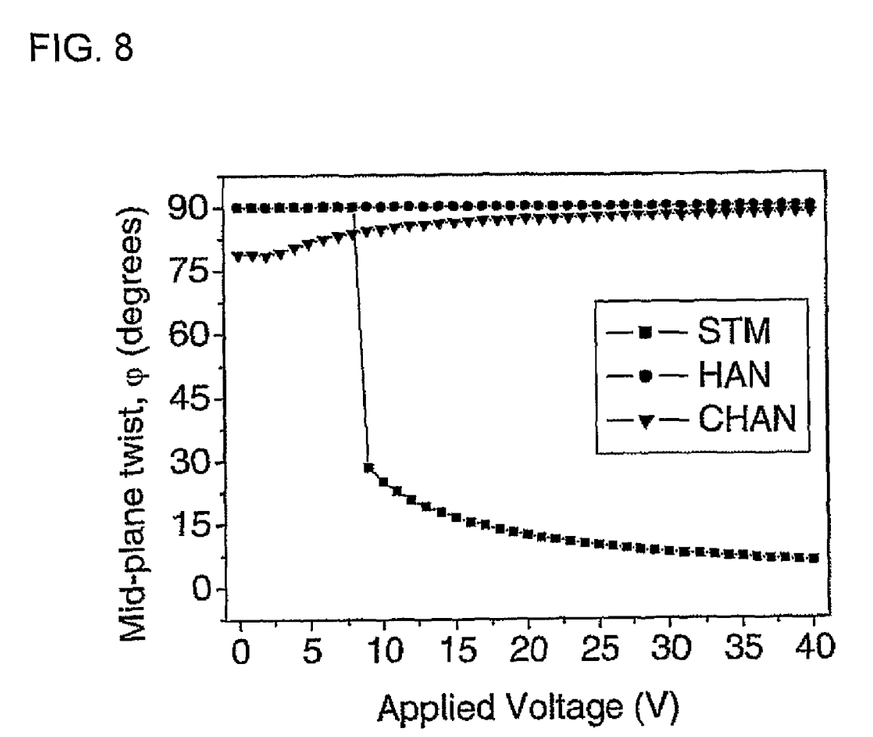
FIG. 8 is a graph of mid-plane twist in degrees against applied voltage for the devices whose performances are illustrated in FIGS. 7a to 7d.

FIG. 8 illustrates the mid-plane twist angle for a splay-twist mode (STM), a HAN mode and a chiral HAN (CHAN) mode. The director details were produced by liquid crystal numerical modelling software (DiMOS, Autronic Melchers). All modelled cell thicknesses were 40 microns. The ratio of cell thickness (d) to chiral pitch (p) in the CHAN mode was 0.1 (i.e. d/p=0.1). The splay-twist mode has parallel rubbing conditions whereas the HAN and CHAN modes have anti-parallel rubbing conditions. The magnitude of the pretilt on the high pretilt substrate is the same for all three modes. The magnitude of the pretilt on the low pretilt substrate is the same for all three modes. FIG. 8 illustrates that the splay-twist mode has a discontinuous jump in the magnitude of the mid-plane twist angle upon application of a suitably large voltage (>9 volts). The discontinuous change occurs because the director structure changes from splay-bend deformation to a splay-twist deformation. However, no change in the mid-plane twist angle is observed for the HAN upon application of a voltage. The mid-plane twist angle for the CHAN does change upon application of a voltage but the change is smooth and continuous, unlike the splay-twist mode. Consequently, anti-parallel rubbing conditions yield a completely different electro-optic response to the parallel rubbing conditions. The splay-twist mode is therefore distinct over the HAN and CHAN modes.

Figure 9A:
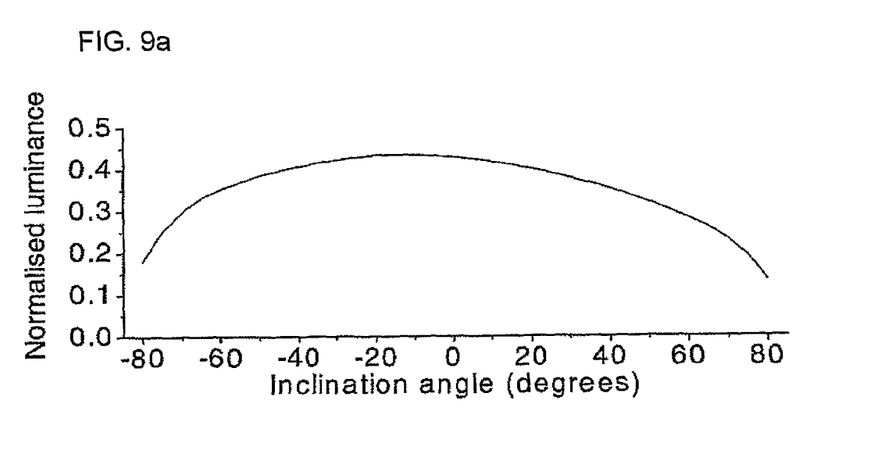
FIGS. 9a to 9i are graphs illustrating performance and operation of three optical regimes of a device of the type illustrated in FIG. 1.
Figure 9B:
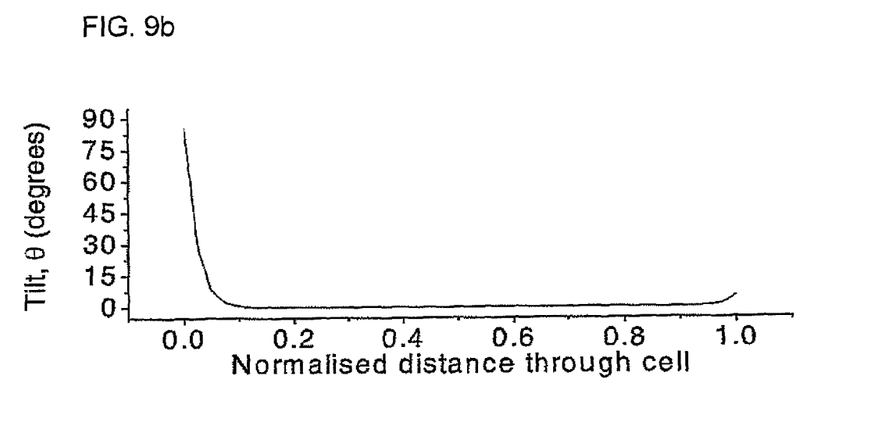
Figure 9C:
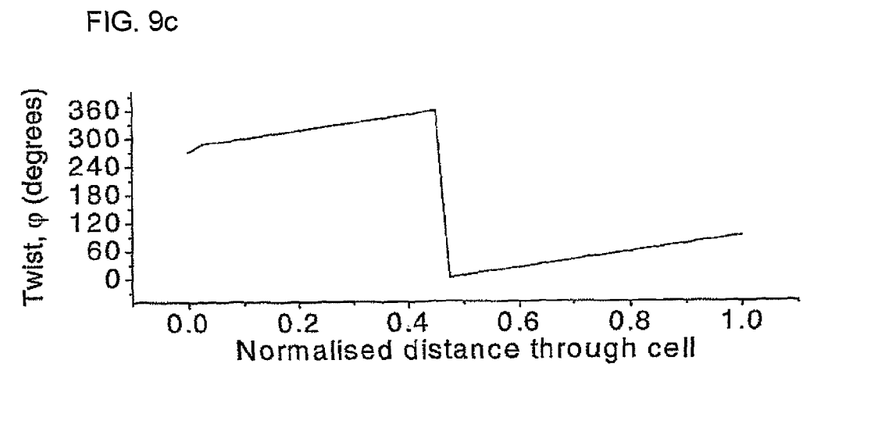
Figure 9D:
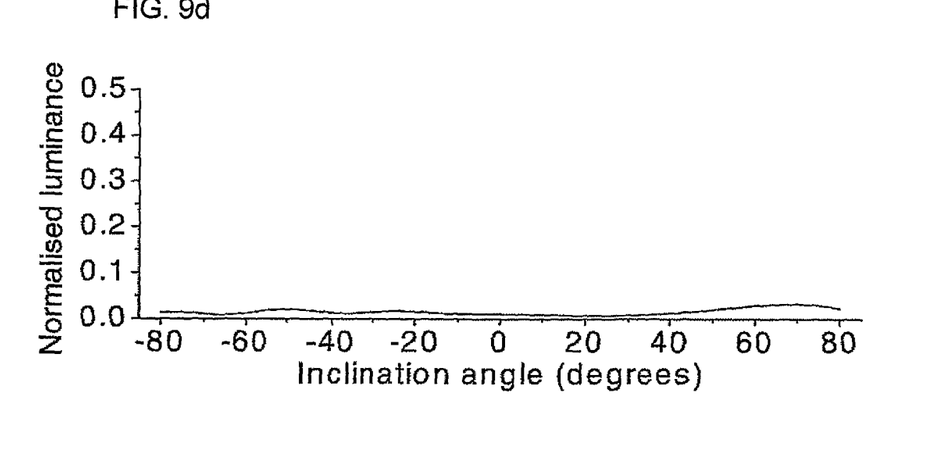
Figure 9E:
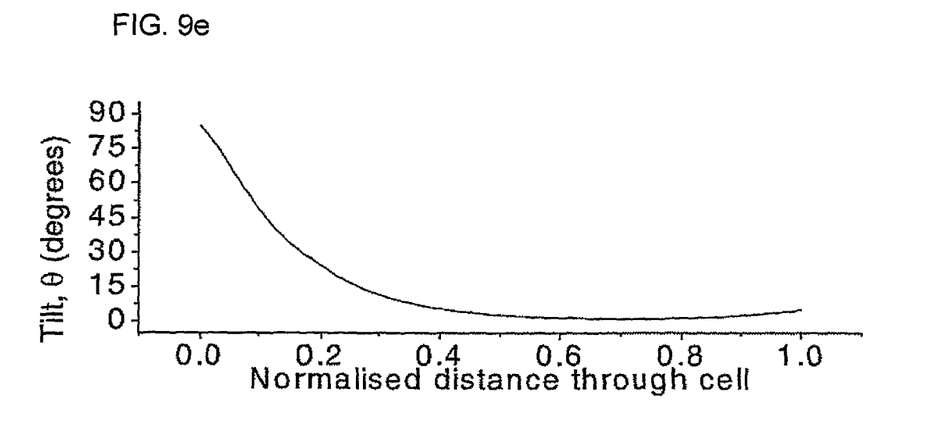
Figure 9F:
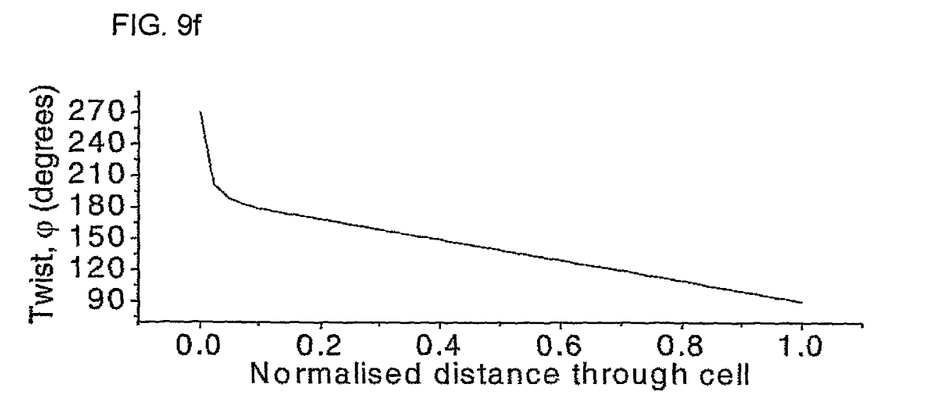
Figure 9G:
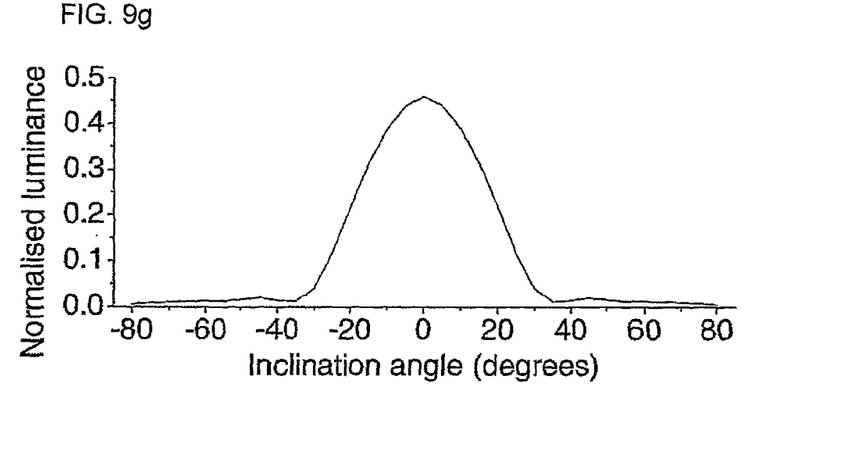
Figure 9H:
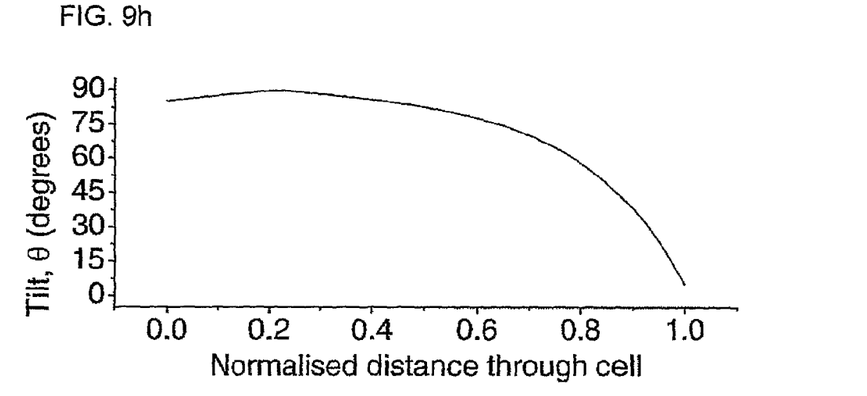
Figure 9I:
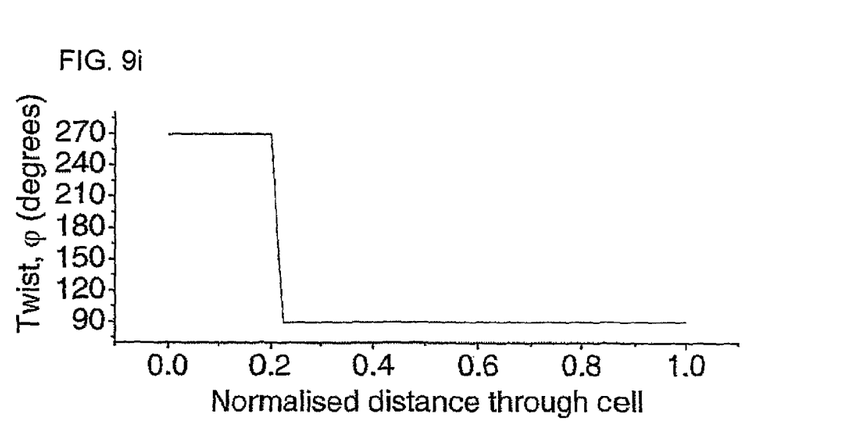

FIGS. 9a to 9i provide an illustration of the three optical regimes that are accessible using the splay-twist mode. The results were obtained using liquid crystal modelling software (Autronic Melchers). The normalised luminance plots are all taken in the plane of maximum privacy with 0° representing an on-axis view of the system (direction perpendicular to substrate). FIG. 9a illustrates the normalised luminance of the public (wide view) mode (optical regime 1) and the corresponding director tilt and twist profiles are shown in FIG. 9b and FIG. 9c. FIG. 9d illustrates the normalised luminance of the mirror and/or autostereoscopic 3D mode (optical regime 2) and the corresponding director tilt and twist profiles are shown in FIG. 9e and FIG. 9f. FIG. 9g illustrates the normalised luminance of the private (narrow view) mode (optical regime 3) and the corresponding director tilt and twist profiles are shown in FIG. 9h and FIG. 9i. The results of optical regime 1 were obtained at 40 volts with $\Delta\epsilon=-3$. The results of optical regime 2 were obtained at 6.75 volts with $\Delta\epsilon=-3$. The results of optical regime 3 were obtained at 4 V with $\Delta\epsilon=+3$. In order to practically realise this modelling work, a dual frequency LC would be required.

Figure 10:
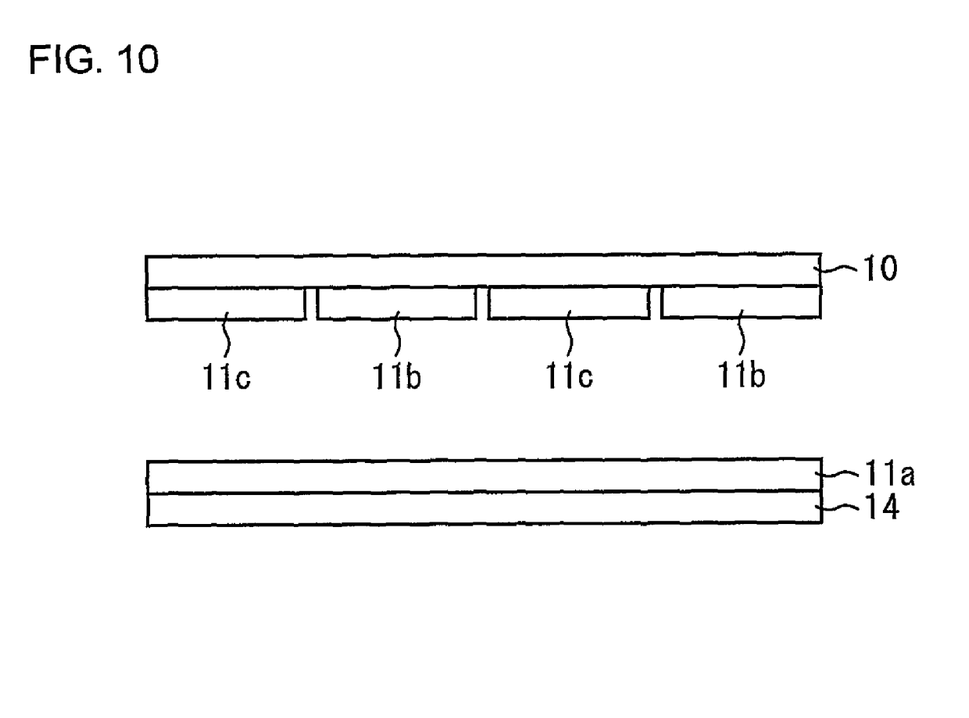
FIG. 10 is a diagrammatic cross-sectional view illustrating an electrode arrangement for permitting a device of the type shown in FIG. 1 to be used as an autostereoscopic 3D display.

FIG. 10 illustrates an electrode arrangement that is required to realise a public (wide view), private (narrow view), autostereoscopic 3D and mirror mode from the splay-twist mode. Electrode 11a is a common electrode (usually ground) whereas electrodes 11b and 11c are interdigitated electrodes and can be addressed separately with voltages V1 and V2, respectively. In order to realise the public (wide view) mode, electrodes 11b and 11c are set to the same voltage (optical regime 1). In order to realise the private (narrow view) mode, electrodes 11b and 11c are set to the same voltage but a voltage that is different from the voltage required for the public (wide view) mode (optical regime 3). In order to realise the mirror mode, electrodes 11b and 11c are set to the same voltages but a voltage that is different from the voltage required for the public (wide view) mode and different from the voltage required for the private (narrow view) mode (optical regime 2). In order to realise an autostereoscopic 3D mode, one of the interdigitated electrodes, 11b for example, provides a voltage V1 to switch alternating columns (or rows) into the public (wide view) mode, while the other interdigitated electrode, 11c, provides a voltage V2 which switches the remaining columns (or rows) into optical regime 2. When the splay-twist mode is placed between parallel polarisers, optical regime 1 appears transmissive for substantially all incident angles while optical regime 2 appears black (non-transmissive) for angles substantially on-axis. Hence a striped parallax barrier is realised. This parallax barrier is placed on top of the existing image LCD panel 6 as shown in FIG. 2. When an appropriate image is displayed on the existing image LCD panel 6 and the parallax barrier is activated, an autostereoscopic 3D image is realised.

Devices of this type may, for example, be applied to apparatuses where a user may wish to view confidential information but cannot control who else may be watching. Examples are personal digital assistants (PDAs), laptop personal computers (PCs), desktop monitors, automatic teller machines (ATMs) and electronic point of sale (EPOS) equipment.

The invention claimed is:

1. A liquid crystal device comprising:
    a first alignment surface arranged to induce a first pretilt which is less than 90° and more than 45° and has a component parallel to the first surface pointing in a predetermined direction;
    a second alignment surface arranged to induce a second pretilt which is greater than 0° and less than 45° and has a component parallel to the second surface pointing in the predetermined direction; and
    a layer of a liquid crystal material disposed between the first and second surfaces, said layer of the liquid crystal material being switchable between a splay-bend deformation and a splay-twist deformation.

2. A device as claimed in claim 1, in which the first pretilt is greater than 65°.

3. A device as claimed in claim 2, in which the first pretilt is greater than 75°.

4. A device as claimed in claim 3, in which the first pretilt is greater than or substantially equal to 85°.

5. A device as claimed in claim 4, in which the first pretilt is substantially equal to 85°.

6. A device as claimed in claim 1, in which the second pretilt is less than 20°.

7. A device as claimed in claim 6, in which the second pretilt is less than 15°.

8. A device as claimed in claim 7, in which the second pretilt is less than or substantially equal to 5°.

9. A device as claimed in claim 8, in which the second pretilt is substantially equal to 5°.

10. A device as claimed in claim 1, in which the first and second surfaces are rubbed in the predetermined direction.

11. A device as claimed in claim 1, in which the material is a nematic liquid crystal material.

12. A device as claimed in claim 11, in which the material contains a chiral dopant.

13. A device as claimed in claim 12, in which the ratio of the thickness of the layer to the chiral pitch is less than 0.75.

14. A device as claimed in claim 13, in which the ratio is substantially equal to 0.3.

15. A device as claimed in claim 1, in which the material is a dual frequency liquid crystal material.

16. A device as claimed in claim 1, comprising an arrangement for applying a field across the layer.

17. A device as claimed in claim 16, in which the field is an electric field.

18. A device as claimed in claim 17, in which the field applying arrangement comprises first and second electrode arrangements disposed on opposite sides of the layer.

19. A device as claimed in claim 18, in which at least one of the first and second electrode arrangements comprises a patterned electrode.

20. A device as claimed in claim 16, in which the field applying arrangement is arranged selectively to apply at least one first field for establishing a splay-bend director configuration, and at least one second field for establishing a splay-twist director configuration.

21. A device as claimed in claim 1, comprising first and second linear polarisers disposed on opposite sides of the layer.

22. A device as claimed in claim 21, in which at least one of the first and second polarisers is a reflective polariser.

23. A device as claimed in claim 21, in which each of the first and second polarisers has a transmission axis which is parallel or perpendicular to the predetermined direction.

24. A display apparatus comprising a device as claimed in claim 1 cooperating with an image display.

25. An apparatus as claimed in claim 24, in which the device is controllable to select any one of a plurality of modes of display operation, from at least some of a private viewing mode, a public viewing mode, a mirror mode and an autostereoscopic mode.

* * * * *